US006904932B1

(12) United States Patent
Haraughty

(10) Patent No.: US 6,904,932 B1
(45) Date of Patent: Jun. 14, 2005

(54) PUMP VALVE ADAPTER

(75) Inventor: James Haraughty, Monona, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 179 days.

(21) Appl. No.: 10/261,348

(22) Filed: Oct. 1, 2002

(51) Int. Cl.$^7$ ............................................. F16K 15/20
(52) U.S. Cl. ...................................... 137/231; 285/316
(58) Field of Search ............................... 137/223, 231; 285/316

(56) References Cited

U.S. PATENT DOCUMENTS

| | | | | |
|---|---|---|---|---|
| 1,498,175 | A | * | 6/1924 | Kraft et al. .................. 137/269 |
| 2,166,402 | A | * | 7/1939 | Gora ........................... 285/316 |
| 2,458,088 | A | * | 1/1949 | Main ........................... 285/316 |
| 2,518,542 | A | * | 8/1950 | Hansen ........................ 285/316 |
| 3,820,827 | A | * | 6/1974 | Boelkins ...................... 285/316 |
| 4,611,828 | A | * | 9/1986 | Brunet ........................... 285/3 |
| 4,781,399 | A | * | 11/1988 | Collon ........................ 285/316 |
| 5,012,954 | A |   | 5/1991 | Will |
| 5,230,538 | A | * | 7/1993 | Kobayashi .................. 285/316 |
| 5,390,963 | A | * | 2/1995 | Namekawa ................. 285/316 |
| 5,433,488 | A |   | 7/1995 | Chiago |
| 5,638,865 | A |   | 6/1997 | Wu |
| 5,645,100 | A |   | 7/1997 | Chuang et al. |
| 5,666,990 | A |   | 9/1997 | Wu |
| 5,683,234 | A |   | 11/1997 | Chuang et al. |
| 5,749,392 | A |   | 5/1998 | Glotin |
| 5,762,095 | A |   | 6/1998 | Gapinski et al. |
| 5,819,781 | A |   | 10/1998 | Wu |
| 5,960,815 | A |   | 10/1999 | Wang |
| 5,983,920 | A |   | 11/1999 | Gapinski et al. |
| 6,073,645 | A |   | 6/2000 | Wu |
| 6,076,544 | A |   | 6/2000 | Pierce |
| 6,102,063 | A |   | 8/2000 | Pierce et al. |
| 6,105,600 | A |   | 8/2000 | Wang |
| 6,105,601 | A |   | 8/2000 | Wang |
| 6,260,572 | B1 |   | 7/2001 | Wu |
| 6,276,391 | B1 |   | 8/2001 | Wu |
| 6,276,405 | B1 |   | 8/2001 | Wang |
| 6,328,057 | B1 |   | 12/2001 | Wang |

FOREIGN PATENT DOCUMENTS

GB      1599304      * 9/1981      ................ 137 231

* cited by examiner

Primary Examiner—John Rivell
(74) Attorney, Agent, or Firm—Boyle Fredrickson Newholm Stein & Gratz S.C.

(57) ABSTRACT

A nozzle adapter for use in converting a nozzle designed for use with Schrader type valves to a nozzle usable with Presta type valves is provided. The nozzle adapter includes an inner sleeve defining a central opening into which the Schrader nozzle can be inserted at one end. The adapter also includes an opening at the opposite end into which a Presta type valve can be inserted. The adapter includes a locking mechanism selectively operable by an outer sleeve that is slidably mounted to the inner sleeve to effectively retain the Schrader nozzle in alignment with the adapter to allow the Schrader nozzle to be utilized as a Presta nozzle.

20 Claims, 7 Drawing Sheets

PUMP VALVE ADAPTER

FIELD OF THE INVENTION

The present invention relates to pumps for inflating tires, and more specifically to an adapter for a pump nozzle that allows the nozzle to be utilized with both Schrader and Presta type air valves.

BACKGROUND OF THE INVENTION

There are two common types of tire air valves in widespread use on inner tubes of vehicle tires. One type is a Schrader type valve which is a reasonably rugged valve in which the valve assembly is protected by an outer casing. Valves of this type are commonly used on automobiles and trucks. These valves have also been used widely on bicycle tires.

However, as designs for bicycles have become more technologically advanced, efforts have been made to alter the form of the valves on the bicycle tires in order to reduce the overall weight of the bicycle. The result of these efforts is the Presta type valve which is now widely used specifically for inner tubes used in bicycle tires.

However, due to the particular construction of a Presta valve, which has an exposed valve stem, it is often the case that the valve stem of a Presta valve is broken while attempting to inflate a bicycle tire having a Presta valve. When the valve stem of a Presta valve is broken, it is necessary to replace the entire inner tube of the bicycle tire, often a time consuming and very inconvenient process.

In order to prevent the valve stem of a Presta valve from breaking, a number of different pump nozzle designs have been developed which accommodate for the relative frag-ileness of the Presta valve and that also can be utilized with the more rugged Schrader type valves.

One type of nozzle design that has been developed for use with Presta and Schrader type valves are pump nozzles in which assemblies for use with each type of valve are positioned at opposite ends of a pump nozzle housing. The pump nozzle can then be physically reversed to accommodate a particular valve type in certain designs. In other designs a movable airflow controller located within the nozzle housing can be adjusted through the use of a lever or other manipulating device to position the controller against the selected receiver on the housing for the appropriate valve type to place the valve in fluid communication with the pump. Examples of patents disclosing pump nozzle designs of this type are: Chiago U.S. Pat. No. 5,433,488; Wu U.S. Pat. No. 5,638,865; and Chuang et al. U.S. Pat. No. 5,645,100.

Still another type of prior art nozzle assembly is shown in Wang U.S. Pat. No. 5,960,815 and Glotin U.S. Pat. No. 5,749,392. In the nozzle designs illustrated in these patents, a pair of separate receivers are contained within a housing for the nozzle that are configured to receive one of the two types of tire valves. After a Schrader or Presta valve is inserting into the housing near the appropriate receiver, the appropriate receiver is then engaged with the valve by pivoting a lever to urge the receiver into engagement with the valve inserted into the housing.

A third type of pump nozzle adapted for use with both Schrader and Presta type valves is illustrated in Gapinski et al. U.S. Pat. No. 5,983,920 and Wu U.S. Pat. No. 5,819,781. In these patents, the pump nozzle is designed with a single opening through which each type of valve can be inserted. The interior of the nozzle is configured to have different diameter sections that properly position either a Schrader valve or a Presta valve within the nozzle. A spring biased engagement member is also disposed within the nozzle housing and, depending upon the type of valve, can be depressed to a specified point within the nozzle in order to appropriately engage the specific valve inserted into the housing.

However, in each of the aforementioned prior art pump nozzle designs, the nozzles require a specialized construction that includes a number of moving parts which need to be effectively sealed with regard to one another and to the housing for the nozzle in order for the nozzle to work appropriately. Based on the presence of these moving parts, should the seals or the moving parts become damaged, the nozzles are effectively prevented from being utilized in conjunction with either type of valve.

Therefore, it is desirable to develop a simple and easy to use pump nozzle adapter which is capable of effectively allowing a pump nozzle to be utilized with Schrader or Presta valves and that does not affect the operation of the pump nozzle if the adapter becomes damaged.

SUMMARY OF THE INVENTION

The present invention is a quick release adapter for a pump nozzle that allows the nozzle to be utilized with both Schrader and Presta type valves. The adapter is releasably securable to a nozzle configured for use with a Schrader type valve, and includes an inner sleeve defining a central opening through which a Presta type valve can be inserted. The opening has a sufficient length to rigidly hold the pump nozzle in alignment with the Presta valve in order ensure that the valve stem of the Presta valve is not damaged while the tire is inflated utilizing the pump nozzle and adapter.

Opposite the opening for the Presta valve, the inner sleeve also includes a wide opening adapted to receive a conventional Schrader valve pump nozzle. The wide opening allows the Schrader valve nozzle to be positioned within the inner sleeve such that the Presta valve can effectively engage the Schrader nozzle in order to allow air from the Schrader nozzle to flow through the Presta valve and into the inner tube.

The adapter is retained in engagement with the Schrader valve nozzle through the use of a releasable locking mechanism disposed on the adapter. The mechanism includes a number of bearings movably disposed within apertures disposed within the inner sleeve around the wide opening. The bearings can be held in a locked position within the apertures such that the bearings extend inwardly into the wide opening, or can be allowed to move outwardly away from the wide opening to an unlocked position through the movement of an outer sleeve slidably mounted around the inner sleeve. The outer sleeve includes an engagement surface which contacts the bearings and urges the bearings into the apertures depending upon the position of the outer sleeve on the inner sleeve. Inadvertent releasing of the locking mechanism is prevented by the presence of a biasing member disposed between the inner sleeve and the outer sleeve which urges the outer sleeve to the locked position. Therefore, only by applying a sufficient force to move the outer sleeve against the bias of the biasing member with respect to the inner sleeve can the adapter be removed from the Schrader valve nozzle.

The adapter provides a simple and effective attachment for a Schrader valve nozzle to enable the nozzle to be effectively utilized with Presta type valves without the need for numerous valve openings or moving parts within the nozzle. Further, the construction of the adapter prevents the Presta valve from shifting with respect to the Schrader nozzle, such that the likelihood of damaging the Presta valve is greatly reduced.

Numerous other features, objects and advantages of the invention will be made apparent from the following detailed description taken together with the drawings.

BRIEF DESCRIPTION OF THE DRAWINGS

The following drawings represent the best mode currently contemplated of practicing the present invention.

In the drawings.

DETAILED DESCRIPTION OF THE INVENTION

Figure 1:
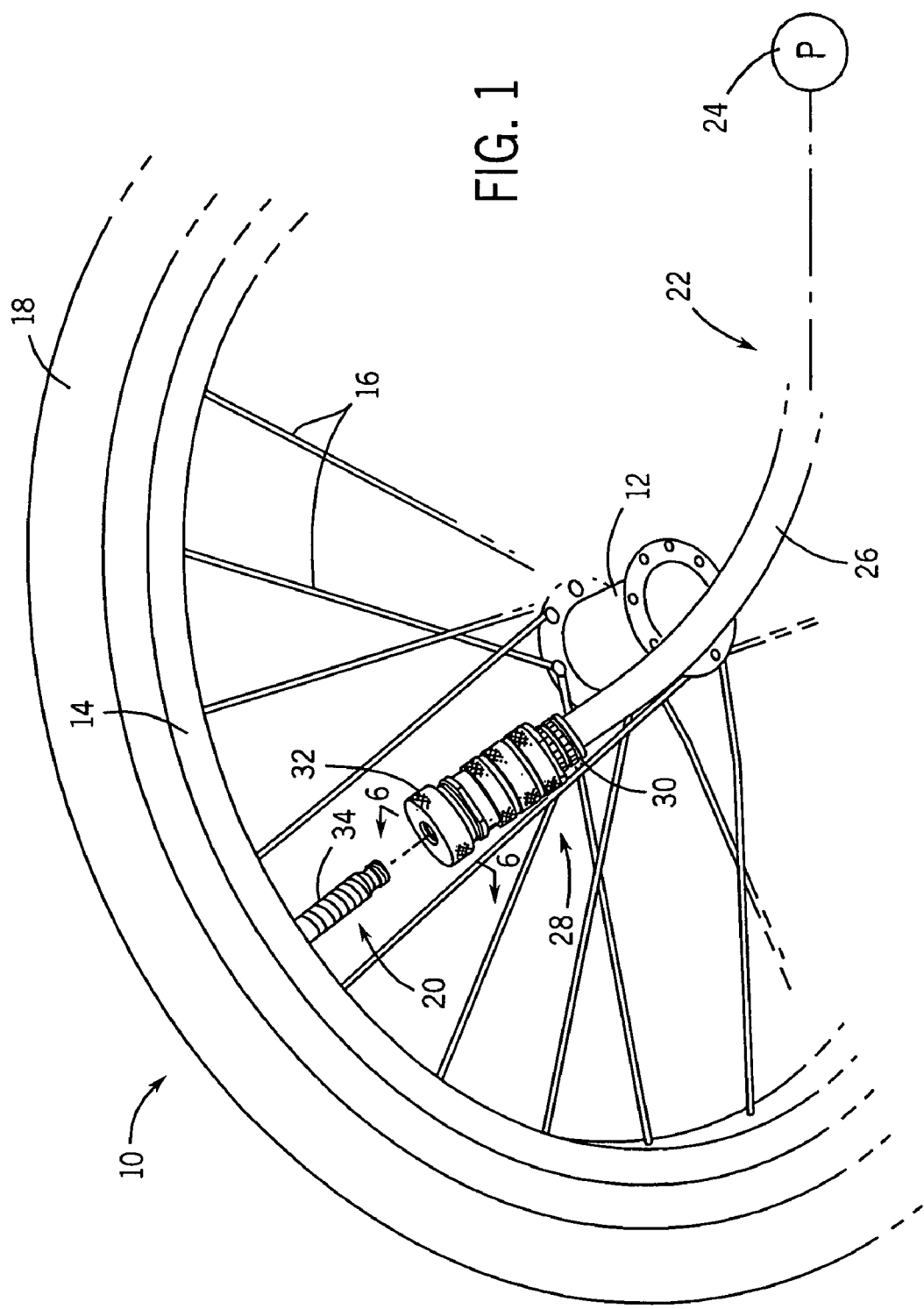
FIG. 1 is an isometric view of the nozzle adapter of the present invention secured to a Schrader type nozzle.
Figure 2:
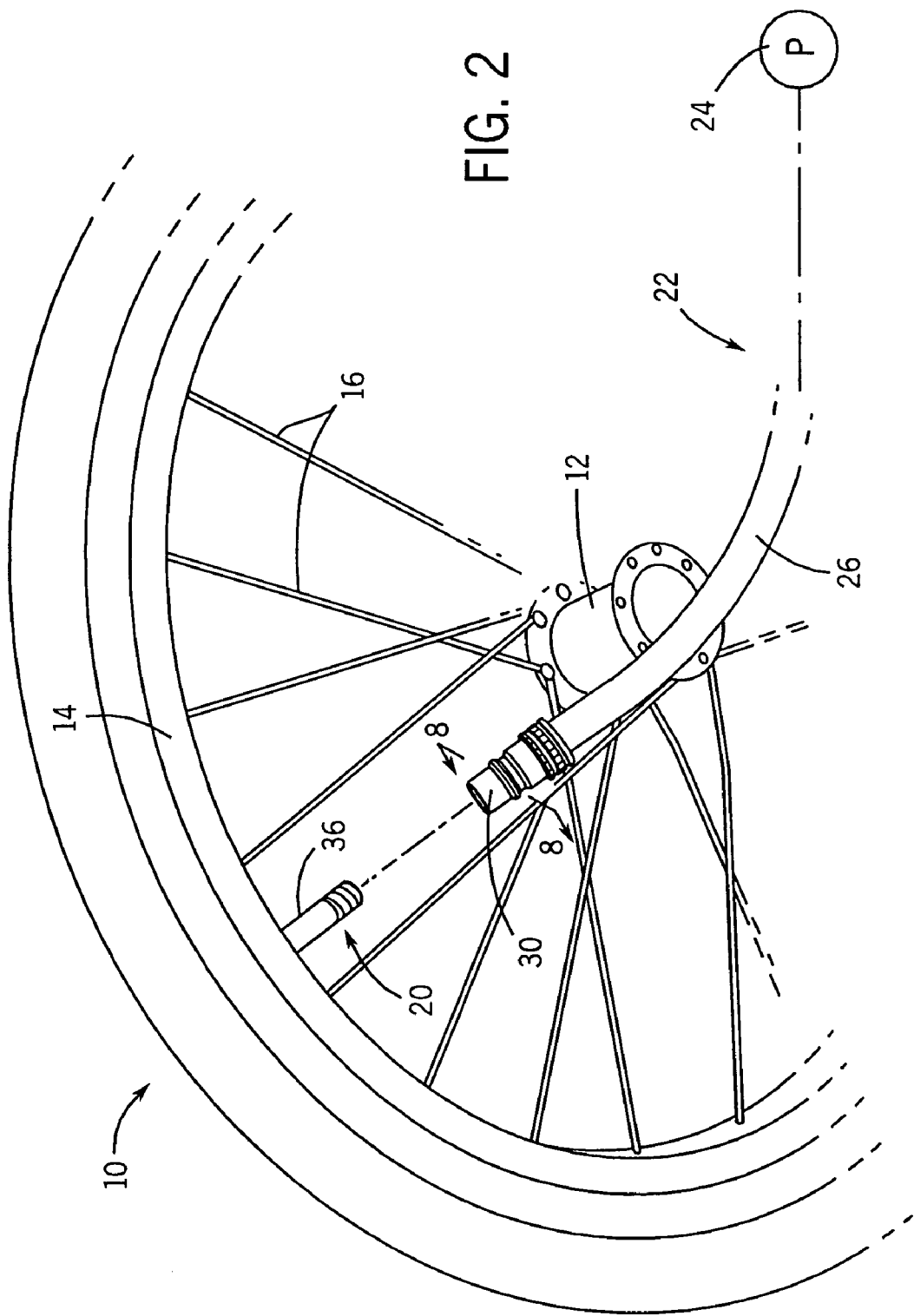
FIG. 2 is an isometric view of the Schrader type nozzle with the nozzle adapter of FIG. 1 removed.

With regard to the drawing figures in which like reference numerals designate like parts throughout the disclosure, a wheel for a bicycle is illustrated generally at 10 in FIG. 1. The wheel 10 includes a hub 12 and rim 14 which are interconnected by a number of spokes 16. The rim 14 supports a tire 18 in which is disposed an inner tube (not shown) that is inflated to internally pressurize the tire 18. The inner tube is inflated through a valve 20 that extends radially inwardly from the inner tube through the rim 14 and towards the hub 12.

To inflate the inner tube, a pumping apparatus 22 is connected to the valve 20 and supplies air through the valve 20 to the tube. The pumping apparatus 22 includes a pumping means 24, a flexible tube 26 extending from the pumping means 24 and a connector 28 secured to the tube 26 opposite the pumping means 24. The pumping means 24 can be an automatic or mechanical pumping means, such as a compressor, or a manual pumping means, such as a hand operated bicycle pump, among others. Further, the flexible tube 26 can be formed of any suitable flexible and air-impermeable material, with a resilient rubber material or flexible plastic material being particularly preferred.

Referring now to FIGS. 1–4, the connector 28 includes two parts, namely, a Schrader valve nozzle 30, which is attached directly to the tube 26, and a nozzle adapter 32 that can be releasably secured to the Schrader nozzle 30 opposite the tube 26. The Schrader nozzle 30 and nozzle adapter 32 are utilized when the pumping apparatus 22 is engaged with a Presta valve 34, shown in FIG. 1, and the Schrader nozzle 30 is used by itself when the nozzle 28 is engaged with a Schrader valve 36 shown in FIG. 2.

Figures 9, 10:
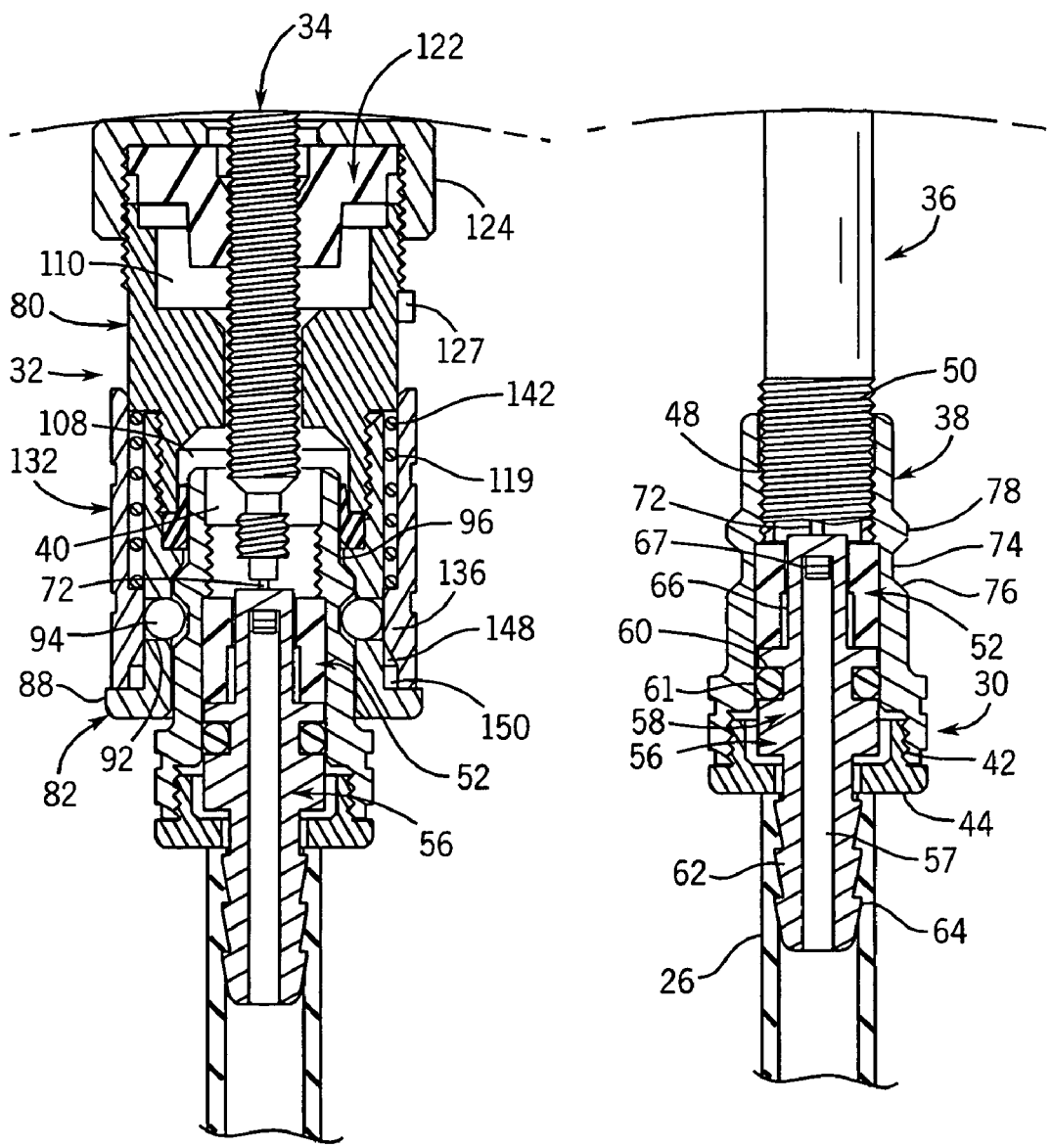
FIG. 9 is a cross-sectional view illustrating the nozzle adapter and Schrader valve nozzle of FIG. 1 engaged with a Presta type valve.
FIG. 10 is a cross-sectional view illustrating the Schrader valve nozzle engaged with a Schrader type valve.

Looking now at FIGS. 5–8, the Schrader nozzle 30 is formed of a first housing 38 that defines a throughbore 40. The throughbore 40 is essentially constant in diameter along its entire length, with a small enlarged portion 42 disposed at one end. The enlarged portion 42 is threaded on its interior and is engageable with an end cap 44 having a central opening 46. Opposite the enlarged portion 42, the first housing 38 further includes an internal threaded section 48 disposed within the throughbore 40 and spaced inwardly from the end of the first housing 38 opposite the enlarged portion 42. The threaded section 48 is able to engage a threaded casing 50 disposed at the outward end of a conventional Schrader valve 36 as illustrated in FIG. 10.

The throughbore 40 also retains a valve collar 52 within the housing 38 spaced between the enlarged portion 42 and the threaded section 48 and abutting the threaded section 48. The collar 52 includes a passage 54 therethrough and defines an annular shoulder 55 between the collar 52 and the housing 38 opposite the threaded section 48.

An airflow-regulating member 56 is inserted into the enlarged portion 42 and through the throughbore 40 of the first housing 38 and is retained therein by the end cap 44 that is threadedly engaged with the enlarged portion 42. The regulating member 56 includes a longitudinal channel 57 that passes through a central body 58 having a diameter approximately equal to the diameter of the throughbore 40. The central body 58 includes an exterior peripheral groove 60 in which is disposed an O-ring 61 or similar sealing member to sealingly engage the regulating member 56 with the first housing 38. The regulating member 56 also includes an engagement portion 62 extending outwardly from the central body 58 through the opening 46 in the end cap 44. The engagement portion 62 includes a number of concentric conically shaped sections 64 that surround the passage 57 and which, when the sections 64 are inserted into the tube 26, retain the nozzle 30 in engagement with the tube 26.

Opposite the engagement portion 62, the regulating member 58 also includes a cylindrical valve portion 66 that surrounds the channel 57 opposite the engagement portion 62 and has a diameter of less than the diameter of the passage 54 in the valve collar 52. When the regulating member 56 is inserted into the first housing 38, the valve portion 66 passes through the passage 54 in the valve collar 52 such that the end of the valve portion 66 extends a small distance past the valve collar 52 opposite the end cap 44. The valve portion 66 also includes a plug 67 located opposite the central body 58 that controls the flow of air through the regulating member 56 to a valve that engages the plug 67. For example, when the threaded section 48 is engaged with the threaded casing 50 of a Schrader valve 36, a valve stem 72 disposed in the center of the threaded casing 50 engages the plug 67 in the valve portion 66 to allow air to flow through the channel 57 from the tube 26 into the Schrader 36 valve past the plug 67, as best shown in FIG. 10.

On the exterior of the nozzle 30 opposite the throughbore 40, the first housing 38 also includes a peripheral groove 74 disposed between a stop portion 76 and a peripheral locking rib 78. The stop portion 76 and locking rib 78 define the groove 74 therebetween which is utilized to releasably connect the nozzle adapter 32 to the first housing 38 in a manner to be described.

As best shown in FIGS. 5–8, the nozzle adapter 32 includes an inner sleeve 80 that is formed of a first section 82 and a second section 84 that are releasably connected to one another. The first section 82 is generally cylindrical in shape, defining a passage 86 therethrough and having a radially outwardly extending peripheral flange 88 at one end. The first section 82 also includes an interior threaded section 90 within the passage 86 and spaced inwardly from the end of the first section 82 opposite the flange 88. A number of inwardly tapering apertures 92 are also formed in the first section 82 between the interior threaded section 90 and the flange 88. The apertures 92 extend completely through the first section 82, with the diameter of each aperture 92 becoming smaller as the aperture 92 progresses toward the passage 86. Each aperture 92 contains a ball bearing 94 therein which has a diameter greater than the overall length of the apertures 92. Further, the diameter of each of the ball bearings 94 is greater than the diameter of each aperture 92 at the passage 86, such that the bearings 94 can extend partially into the passage 86, but may not completely pass into the passage 86. As a result, when the bearings 94 are positioned within the apertures 92 such that the outermost surface of the bearings 94 is flush with the exterior of the first section 82, the innermost surface of each bearing 94 is positioned within the passage 86.

The first section 82 also includes an inwardly extending radial flange 96 disposed with the passage 86 between the apertures 92 and the interior threaded section 90. The flange 96 includes an inwardly tapering wall 98 adjacent the apertures 92, and forms a flat annular shoulder 100 opposite the tapering wall 98.

The second section 84 is also generally cylindrical in shape but includes a narrow first end 102 and a wide second end 104 separated by an annular shoulder 105. The second section 84 defines a channel 106 extending through the second section 84 from the first end 102 to the second end 104 which includes a wide portion 108 adjacent the first end 102, a collar-receiving portion 110 opposite the wide portion 108 and a narrow portion 112 connecting the wide portion 108 and collar-receiving portion 110.

On the exterior of the first end 102 is disposed an interior threaded section 114, and the exterior of the second end 104 opposite the first end 102 includes an exterior threaded section 116. The diameter of the first end 102 is slightly smaller than the diameter of the first section 82 such that the exterior threaded section 114 on the first end 102 can be engaged with the interior threaded section 90 disposed within the passage 86 of the first section 82. The second section 84 is properly engaged with the first section 82 when the annular shoulder 105 separating the first end 102 and second end 104 of the second section 84 is positioned in abutting engagement with the first section 82.

In this position, the second section 84 also operates to engage and hold a sealing collar 119 between the first section 82 and the second section 84. The collar 119 is positioned within the passage 86 and has an outer ring 120 that rests on the annular shoulder 100 and an inner ring 121 extending from the inner circumference of the outer ring 120. The outer ring 120 is compressed between the first portion 82 and second portion 84 to ensure that no air leaks through the first sleeve 80. The inner ring 121 extends inwardly from the outer ring 120 and is positioned to sealingly engage the housing 38 of the nozzle 30 when the adapter 32 is engaged with the nozzle 30.

The collar-receiving portion 110 of the channel 106 receives an aligning collar 122 that is retained therein by an end cap 124 having a central opening 125 that is threadedly engaged over and around the aligning collar 122 to the exterior threaded section 116. The cap 124 is properly engaged with the second section 84 when the cap 124 contacts a stop 127 located on the second section 84 immediately adjacent the exterior threaded section 116.

The aligning collar 122 includes a base 126 that is sealingly engaged with the periphery of the collar-receiving portion 110 to properly position the collar 122, and an outwardly extending ring 128 disposed opposite the end cap 124. The base 126 and ring 128 define a passage 130 extending therethrough that is aligned with the narrow portion 112 of the channel 106 and the central opening 125 in the end cap 124 to align a Presta valve 34 inserted into the adapter 32 with the nozzle 30, as best shown in FIG. 9. To ensure that the Presta valve 34 is properly engaged with the nozzle 30, the passage 130 extending through the collar 122 has a diameter slightly less than the diameter of the narrow portion 112 of the channel 106. Also, the collar 122 can be formed of a rigid material, such as a metal or hard plastic, or from a semi-flexible material such that the ring 128 and base 126 can flex a small amount when contacted by the Presta valve 34 inserted through the passage 130 to further lessen the possibility of damaging the Presta valve 34.

In order to secure the adapter 32 to the nozzle 30, the adapter 32 further includes an outer sleeve 132 positioned around the exterior of the inner sleeve 80. The outer sleeve 132 is generally cylindrical in shape and defines a throughbore 134 having a diameter slightly greater than the diameter of the inner sleeve 80. The outer sleeve 132 also includes an inwardly extending peripheral flange 136 located in the throughbore 134 that defines an annular shoulder 138 at one end.

When the outer sleeve 132 is positioned around the inner sleeve 80, a first end 140 of the outer sleeve 132 is positioned against the peripheral flange 88 of the first section 82. The outer sleeve 132 is maintained in this position by a spring 142 positioned between the outer sleeve 132 and the inner sleeve 80 that engages the annular shoulder 105 on the second section 84 at one end, and the annular shoulder 138 on the peripheral flange 136 at the opposite end. The outer sleeve 132 can be slid along the inner sleeve against the bias of the spring 142 from the position where the first end 140 of the sleeve 132 contacts the flange 88 to a position where a second end 144 of the sleeve 132 contacts the stop 127 extending outwardly from the second portion 84 adjacent the exterior threaded section 116.

Figures 3, 4:
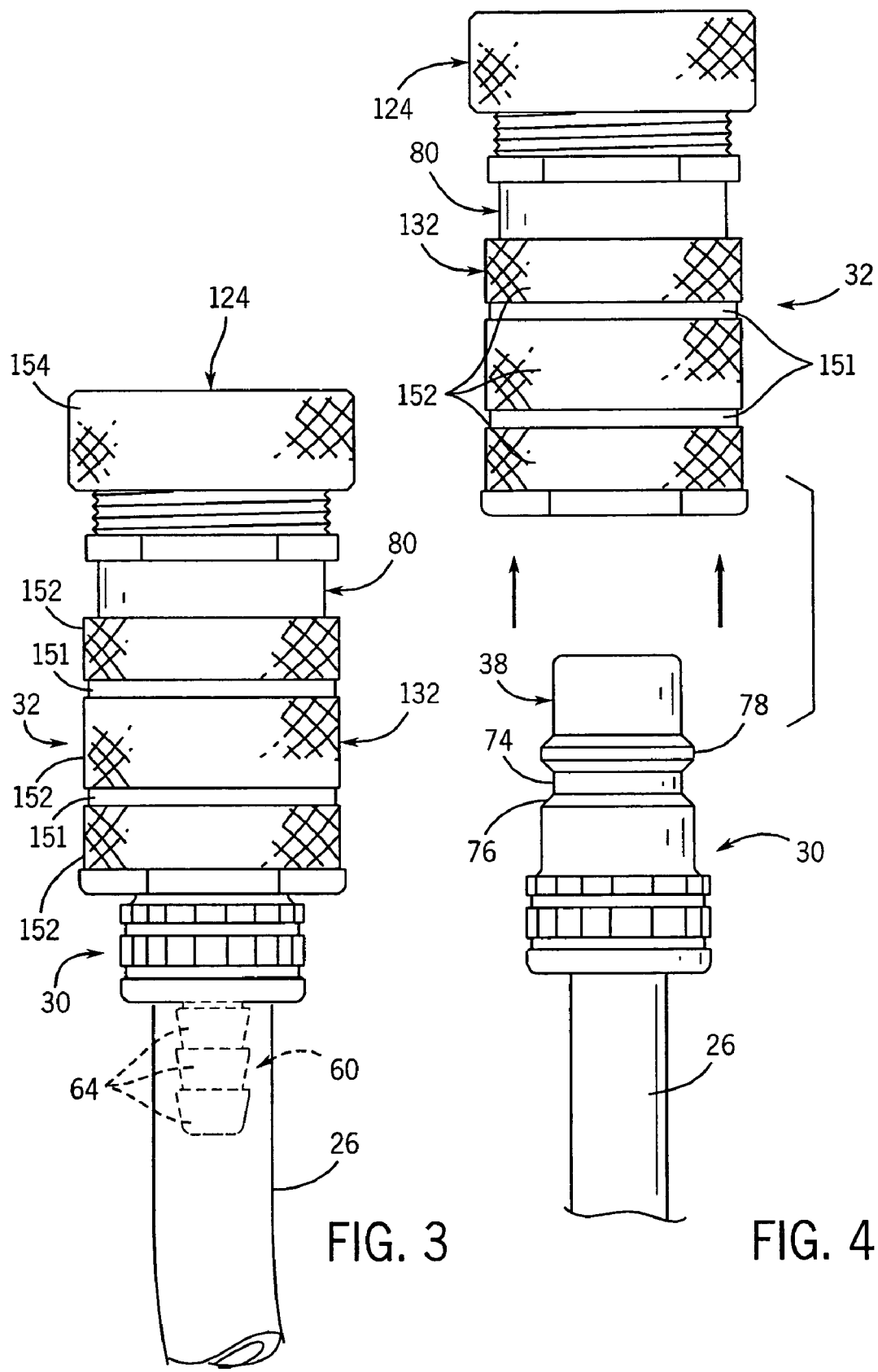
FIG. 3 is a side plan view of the nozzle adapter of FIG. 1 secured to the Schrader type nozzle.
FIG. 4 is a side plan view of the nozzle adapter of FIG. 1 removed from the Schrader valve nozzle.
Figure 5:
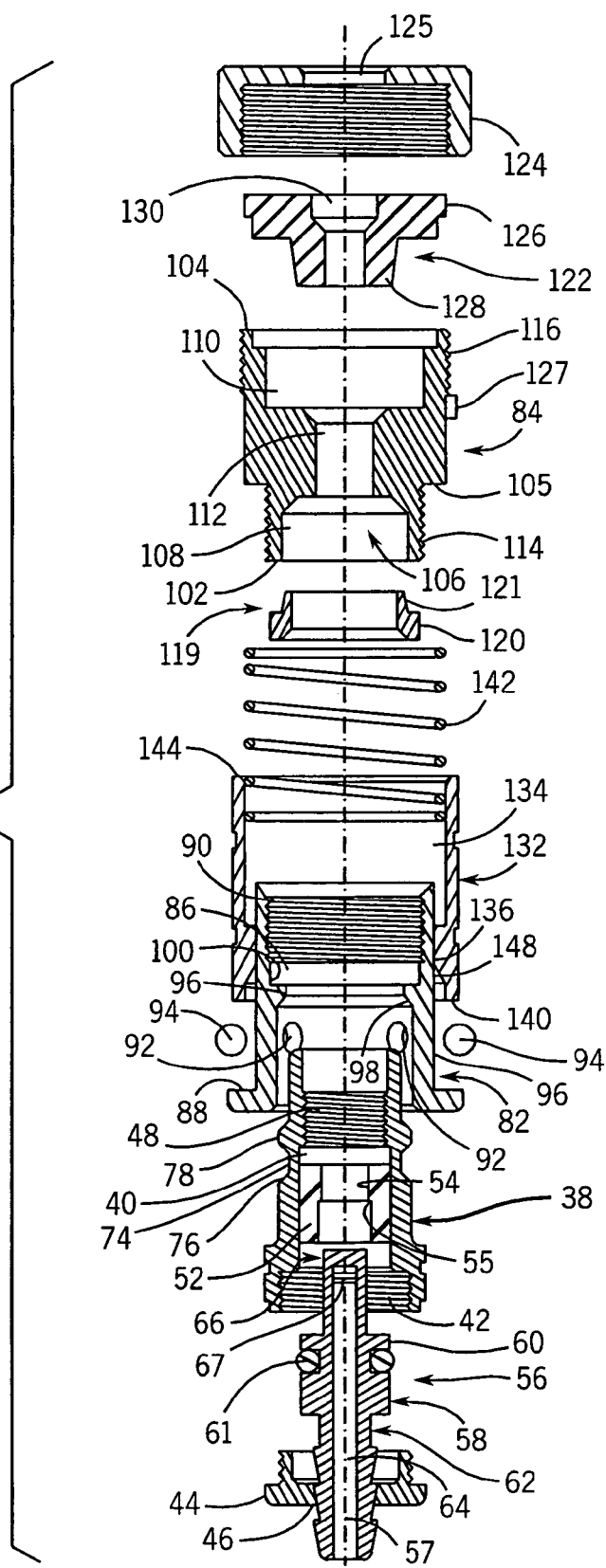
FIG. 5 is an exploded side plan view of the nozzle adapter and Schrader valve nozzle of FIG. 1.
Figures 6, 7:
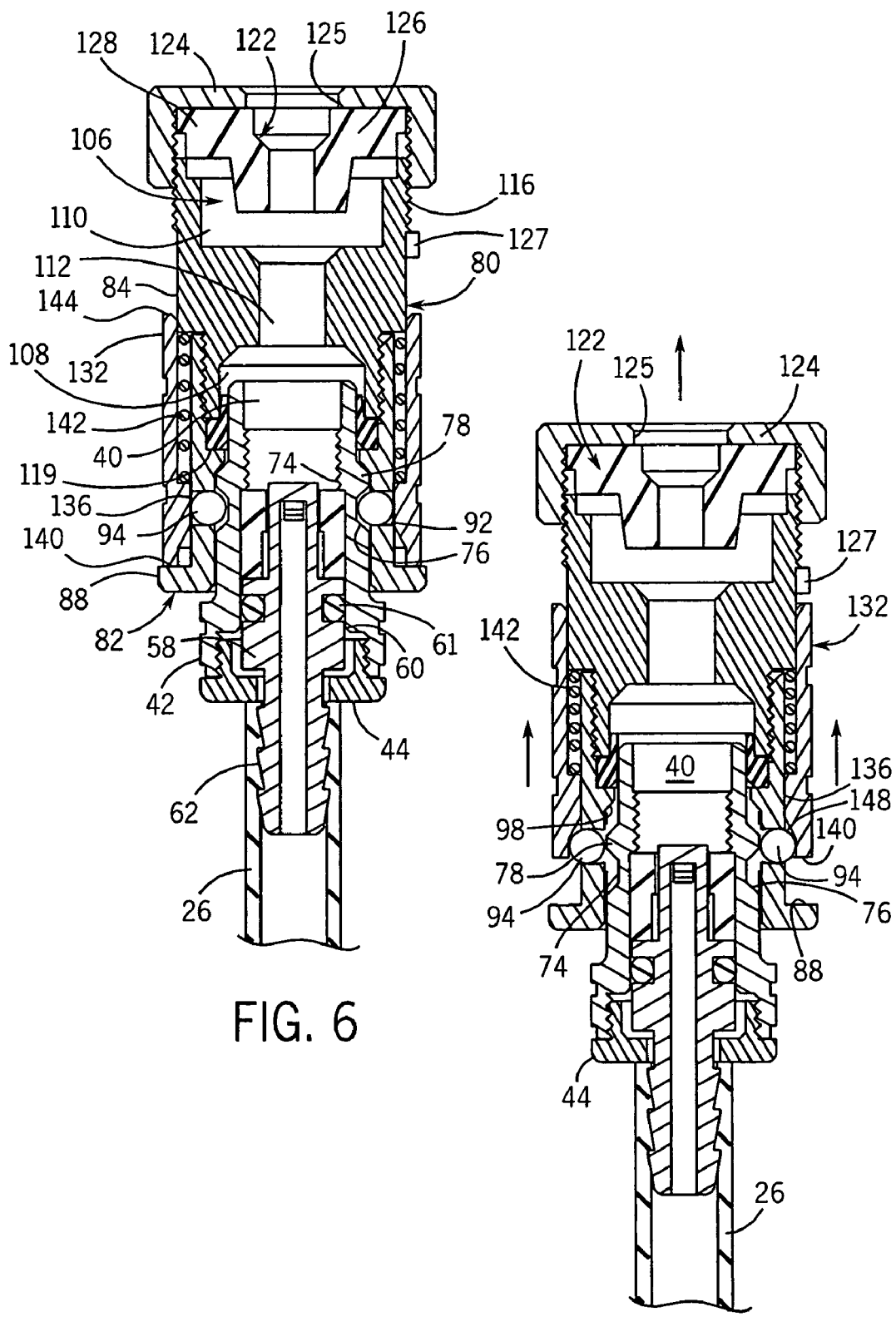
FIG. 6 is a cross-sectional view along line 6—6 of FIG. 3 showing the nozzle adapter secured to the Schrader valve nozzle.
FIG. 7 is a cross-sectional view similar to FIG. 6 showing the nozzle adapter in a partially disengaged position.
Figure 8:
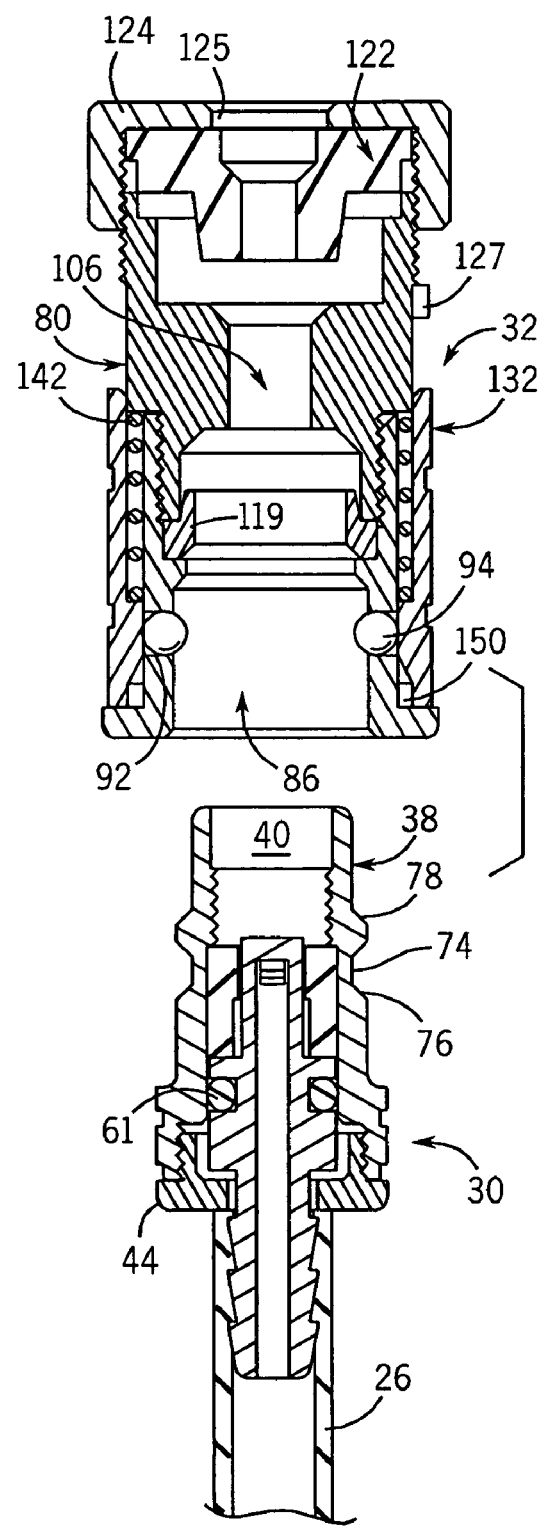
FIG. 8 is a cross-sectional view along line 8—8 of FIG. 4 showing the nozzle adapter in a completely disengaged position.

The peripheral flange 136 disposed in the throughbore 134 of the outer sleeve 132 also includes a sloped surface 148 located opposite the annular shoulder 138 that allows the bearings 94 to move within the apertures 92. When the first end 140 of the outer sleeve 132 is positioned against the flange 88, the peripheral flange 136 is positioned over each of the apertures 92 such that the flange 136 pushes the bearings 94 as far as possible into the passage 86 of the first section 82. When the outer sleeve 132 is slid away from the flange 88 against the bias of the spring 142, the sloped surface 148 of the flange 136 provides a gradually increasing space 150 around the inner sleeve 80 adjacent the bearings 94 that enables the bearings 94 to move outwardly within the apertures 92 such that the bearings 94 can be moved completely out of the passage 86. To assist the movement of the outer sleeve 132 with respect to the inner sleeve 80, the exterior of the outer sleeve 132 includes a number of alternating grooves 151 and knurled surfaces 152 and the exterior of the end cap 124 also has a knurled surface 154 that aid in gripping the respective parts of the adapter 132, as best shown in FIGS. 3 and 4.

Referring again to FIGS. 6–8, to connect the nozzle adapter 32 to the Schrader nozzle 30, initially the outer sleeve 132 is moved towards the stop 127 against the bias of the spring 142 to enable the bearings 94 to move out of the passage 86. The housing 38 of the Schrader nozzle 30 is then inserted into the passage 86 of the inner sleeve 80 such that the locking rib 78 on the housing 38 contacts and pushes the bearings 94 out of the passage 86 through the apertures 92 and into engagement with the sloped surface 148 on the peripheral flange 136 which also serves to hold the bearings 94 at least partially in the apertures 92. Simultaneously, the housing 38 contacts the inner ring 121 of the sealing collar 121 to provide an airtight engagement between the Schrader nozzle 30 and the nozzle adapter 32. The nozzle 30 is then pushed further into the passage 86 until the rib 78 is pressed against the tapering wall 98 of the flange 96, which also positions the groove 74 in alignment with the apertures 92. The outer sleeve 132 can then be released such that the spring 142 biases the first end 140 of the sleeve 132 back towards the flange 88 of the first section 82. In doing so, the spring 142 forces the peripheral flange 136 back into engagement with the bearings 94, causing the bearings 94 to be pushed through the apertures 92 and into the passage 86 and groove 74 on the housing 38. The presence of the bearings 94 within the groove 74 prevents the withdrawal of the housing 38 from within the nozzle adapter 32, thereby locking the adapter 32 onto the nozzle 30. A Presta nozzle 34 can then be inserted into the adapter 32 and engaged with the nozzle 30, as shown in FIG. 9.

To remove the adapter 32 from the nozzle 30 to enable the nozzle 30 to engage a Schrader valve 36, the outer sleeve 132 is pushed away from the nozzle 30 against the bias of the spring 142 until the second end 144 of the outer sleeve 132 contacts the stop 127. This moves the sloped surface 148 into alignment with the bearings 94 and apertures 92 so that, when pulling the housing 38 out of the adapter 32, the locking rib 78 can push the bearings 94 out of the passage 86 and into the space 150, allowing the nozzle 30 to be removed from within the adapter 32.

While the above description illustrates a preferred embodiment of the invention, other embodiments of the invention and variations of the preferred embodiment are also contemplated. For example, each part of the invention, with the exception of the sealing member 61 and sealing collar 119, is preferably formed of a substantially rigid material, such as a metal or hard plastic, with the metal brass being especially preferred. Further, while the various rigid parts of the adapter 32 are shown as being formed separately from one another, these parts can also be formed from the same material integrally with one another. Further, instead of utilizing the spring 142, the outer sleeve 132 can be threadedly engaged to the inner sleeve 80 or engaged in another suitable manner allowing the outer sleeve 132 to move with respect to the inner sleeve 80 to move the adapter between a locked and unlocked position, as described previously.

Various alternative embodiments are contemplated as being within the scope of the following claims which particularly point out and distinctly claim the subject matter regarded as the invention.

I claim:

1. A connector for use in inflating a tire, the connector comprising:
   a) a nozzle including an airflow regulating means and adapted to be secured to a supply hose connected to an air pumping means opposite the nozzle, the nozzle adapted to engage a first valve; and
   b) an adapter releasably mountable around the nozzle opposite the supply hose and adapted to engage a second valve.

2. The connector of claim 1 wherein the adapter is releasably secured to the nozzle by a releasable locking mechanism disposed on the adapter.

3. The connector of claim 1 wherein the adapter includes an inner sleeve defining a central opening therethrough and an outer sleeve movably disposed on the inner sleeve.

4. The connector of claim 3 wherein the adapter is releasably secured to the nozzle by a releasable locking mechanism disposed on the adapter.

5. The connector of claim 4 wherein the locking mechanism includes a bearing member movably secured within an opening in the inner sleeve and an engaging surface disposed on the outer sleeve and engageable with the bearing member.

6. The connector of claim 5 wherein the adapter further includes a biasing member engaged between the inner sleeve and the outer sleeve to bias the engaging surface into engagement with the bearing member.

7. The connector of claim 5 wherein the bearing member is releasably engageable with a locking member disposed on the nozzle.

8. The connector of claim 7 wherein the locking member is a peripheral rib extending around the nozzle.

9. The connector of claim 3 wherein the central opening in the adapter includes a wide portion adjacent one end and a narrow portion adjacent the opposite end.

10. The connector of claim 9 wherein the wide portion has an inner diameter slightly larger than the exterior diameter of the nozzle.

11. The connector of claim 9 wherein the wide portion includes a sealing member releasably engageable with the nozzle.

12. The connector of claim 9 wherein the adapter includes an aligning collar disposed on the inner sleeve adjacent the narrow portion and including a passage aligned with the narrow portion.

13. The connector of claim 12 wherein the aligning collar is releasably secured to the inner sleeve.

14. The connector of claim 12 wherein the aligning collar includes a passage having an inner diameter slightly less than the inner diameter of the narrow portion.

15. The nozzle of claim 12 wherein the aligning collar is formed from a generally flexible material.

16. A method of inflating a tire including a valve, the method comprising the steps of:
   a. providing a pumping apparatus including a pumping means and a dispensing nozzle operably connected to the pumping means and having an interior surface and an exterior surface;
   b. adjusting the nozzle to fit the valve;
   c. engaging the nozzle with the valve; and
   d. switching on the pumping means, wherein the step of adjusting the nozzle comprises releasably locking a nozzle adapter onto the exterior surface of the nozzle.

17. The method of claim 16 wherein the step of locking the nozzle adapter onto the nozzle comprises the steps of:
   a. providing a nozzle adapter including an inner sleeve having a central opening and an outer sleeve disposed around the inner sleeve; and
   b. positioning the nozzle within the central opening in the inner sleeve.

18. The method of claim 17 wherein the step of positioning the nozzle within the central opening comprises the steps of:
   a. moving the outer sleeve in the first direction with respect to the inner sleeve to disengage a locking mechanism on the nozzle adapter;

b. inserting the nozzle into the central opening; and c. moving the outer sleeve in a second direction opposite the first direction to engage the locking mechanism with the nozzle.

19. The method of claim 18 wherein the nozzle adapter includes a spring disposed between the inner sleeve mid the outer sleeve, and wherein the step of moving the outer sleeve in the first direction comprises pushing the outer sleeve against the bias of the spring.

20. A method of inflating a tire including a valve, the method comprising the steps of:

a. providing a pumping apparatus including a pumping means and a dispensing nozzle operably connected to the pumping means and having an interior surface and an exterior surface;

b. adjusting the nozzle to fit the valve;

c. engaging the nozzle with the valve; and d. switching on the pumping means, wherein the step of adjusting the nozzle comprises unlocking a nozzle adapter from the exterior surface of the nozzle.

* * * * *

UNITED STATES PATENT AND TRADEMARK OFFICE
CERTIFICATE OF CORRECTION

PATENT NO. : 6,904,932 B1
DATED : June 14, 2005
INVENTOR(S) : Haraughty

It is certified that error appears in the above-identified patent and that said Letters Patent is hereby corrected as shown below:

Column 9,
Line 6, "mid" should read -- and --.

Signed and Sealed this

Sixteenth Day of August, 2005

JON W. DUDAS
*Director of the United States Patent and Trademark Office*